United States Patent
Lee et al.

(10) Patent No.: US 11,977,828 B2
(45) Date of Patent: May 7, 2024

(54) METHOD FOR DETECTING STOCHASTIC WEAK POINTS OF LAYOUT PATTERN OF SEMICONDUCTOR INTEGRATED CIRCUIT AND COMPUTER SYSTEM PERFORMING THE SAME

(71) Applicant: SAMSUNG ELECTRONICS CO., LTD., Suwon-si (KR)

(72) Inventors: Seungjin Lee, Yongin-si (KR); Yunkyoung Song, Hwaseong-si (KR); Dawoon Choi, Suwon-si (KR); Kyoil Koo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 17/486,794

(22) Filed: Sep. 27, 2021

(65) Prior Publication Data
US 2022/0207227 A1   Jun. 30, 2022

(30) Foreign Application Priority Data

Dec. 28, 2020   (KR) .................. 10-2020-0185084

(51) Int. Cl.
| | | |
|---|---|---|
| *G06F 30/392* | (2020.01) | |
| *G03F 7/00* | (2006.01) | |
| *H01L 21/308* | (2006.01) | |
| *G06F 111/08* | (2020.01) | |
| *G06F 111/10* | (2020.01) | |

(52) U.S. Cl.
CPC ........ *G06F 30/392* (2020.01); *G03F 7/70033* (2013.01); *G03F 7/70625* (2013.01); *G03F 7/7065* (2013.01); *H01L 21/308* (2013.01); *G06F 2111/08* (2020.01); *G06F 2111/10* (2020.01)

(58) Field of Classification Search
CPC ............... G06F 30/392; G06F 2111/08; G06F 2111/10; G03F 7/70625; G03F 7/7065
See application file for complete search history.

(56) References Cited

U.S. PATENT DOCUMENTS

| | | |
|---|---|---|
| 10,262,831 B2 | 4/2019 | Cross et al. |
| 10,325,058 B2 | 6/2019 | Lee et al. |
| 10,474,042 B2 | 11/2019 | Biafore et al. |

(Continued)

*Primary Examiner* — Binh X Tran
(74) *Attorney, Agent, or Firm* — F. CHAU & ASSOCIATES, LLC (57) ABSTRACT

A method for detecting a stochastic weak point of a layout pattern of a semiconductor integrated circuit includes: forming a semiconductor integrated circuit by exposing a wafer which is masked by a layout pattern and coated with a photoresist to light, and etching the circuit according to the layout pattern, calculating line edge roughness (LER) of the circuit, and calculating a variability constant for fitting the line edge roughness to a normal distribution from a polymer concentration value of the photoresist. The polymer concentration value is calculated from modeling the layout pattern, a total value of intensity of light reaching the photoresist, and an intensity value of light reaching one point of the photoresist. The method further includes calculating a probability distribution of the polymer concentration value of the layout pattern based on the variability constant, and calculating a stochastic weak point of the layout pattern from the probability distribution.

15 Claims, 9 Drawing Sheets

(56) References Cited

U.S. PATENT DOCUMENTS

| | | | |
|---|---|---|---|
| 10,645,411 B2 | 1/2020 | Hansen | |
| 10,740,888 B2 | 8/2020 | Haque et al. | |
| 2018/0246419 A1* | 8/2018 | Liu | G03F 7/70608 |
| 2019/0228119 A1* | 7/2019 | Kimura | G06F 17/16 |
| 2020/0026962 A1 | 1/2020 | Sma et al. | |
| 2020/0057371 A1* | 2/2020 | Nagahara | G03F 7/16 |
| 2020/0142297 A1 | 5/2020 | Park | |
| 2021/0066027 A1* | 3/2021 | Mack | G06T 7/49 |
| 2022/0067260 A1* | 3/2022 | Jin | G03F 7/70433 |
| 2022/0342316 A1* | 10/2022 | Kooiman | G03F 7/70625 |

* cited by examiner

METHOD FOR DETECTING STOCHASTIC WEAK POINTS OF LAYOUT PATTERN OF SEMICONDUCTOR INTEGRATED CIRCUIT AND COMPUTER SYSTEM PERFORMING THE SAME

CROSS-REFERENCE TO RELATED APPLICATION

This application claims priority under 35 USC § 119 to Korean Patent Application No. 10-2020-0185084 filed on Dec. 28, 2020 in the Korean Intellectual Property Office, the disclosure of which is incorporated by reference herein in its entirety.

TECHNICAL FIELD

Embodiments of the present disclosure relate to a method for detecting a stochastic weak point of a layout pattern of a semiconductor integrated circuit and a computer system for performing the same.

DISCUSSION OF THE RELATED ART

Semiconductor devices are integral components to many electronic products today. The fabrication of semiconductor devices involves a photolithographic process, in which ultraviolet (UV) light is applied to a photoresist layer, forming portions on the layer that are then etched away to create circuit patterns.

As newer semiconductor devices are becoming highly integrated, patterns of semiconductor devices are becoming more refined, and conventional fabrication processes are reaching a limit of how densely the circuit patterns may be etched. For example, in conventional systems, when a layout pattern of a semiconductor integrated circuit is formed on a wafer, defects (e.g., pattern bridges, or the like) may occur in patterns formed on a wafer.

SUMMARY

An embodiment of the present disclosure includes a method for detecting a stochastic weak point of a layout pattern of a semiconductor integrated circuit by modeling quantum mechanical variability of intensity of light irradiated onto a photoresist, and a computer system for performing the same.

An embodiment of the present disclosure provides a method for detecting a stochastic weak point of a layout pattern of a semiconductor integrated circuit, which includes: forming a semiconductor integrated circuit by exposing a wafer, masked by a layout pattern and coated with a photoresist, to light from a light source, and etching the semiconductor integrated circuit according to the layout pattern, and calculating line edge roughness (LER) of the semiconductor integrated circuit. The method further includes calculating a variability constant for fitting the line edge roughness to a normal distribution, from a polymer concentration value of the photoresist, where the polymer concentration value is calculated from modeling the layout pattern, a total value of intensity of light reaching the photoresist, and an intensity value of light reaching one point of the photoresist. The method further includes calculating a probability distribution of the polymer concentration value of the layout pattern based on the variability constant, and calculating a stochastic weak point of the layout pattern from the probability distribution.

An embodiment of the present disclosure provides a method for detecting a stochastic weak point of a layout pattern of a semiconductor integrated circuit, which includes: forming a semiconductor integrated circuit by exposing a wafer coated with a photoresist and masked with a layout pattern, and calculating line edge roughness (LER) from the semiconductor integrated circuit, calculating a variability constant for fitting the line edge roughness to a normal distribution from a result value calculated by simulating the layout pattern, calculating a probability distribution of the polymer concentration value at one point of the layout pattern based on the variability constant, and calculating a stochastic weak point of the layout pattern from the probability distribution.

An embodiment of the present disclosure provides a computer system, which includes: a library configured to store a layout pattern for forming a semiconductor integrated circuit, and a detection module configured to detect a stochastic weak point from the layout pattern provided from the library, wherein the library stores line edge roughness (LER) of the semiconductor integrated circuit formed by exposing a wafer coated with a photoresist and masked with a layout pattern, wherein the detection module calculates a variability constant for fitting the line edge roughness to a normal distribution from a polymer concentration value of the photoresist, where the polymer concentration value is calculated from modeling the layout pattern, a total value of intensity of light reaching the photoresist, and an intensity value of light reaching one point of the photoresist. The detection module also calculates a probability distribution of the polymer concentration value from one point of the layout pattern based on the variability constant, and calculates a stochastic weak point of the layout pattern from the probability distribution.

BRIEF DESCRIPTION OF THE DRAWINGS

The above and other aspects, features, and advantages of the present inventive concept will be more clearly understood from the following detailed description, taken in conjunction with the accompanying drawings, in which.

DETAILED DESCRIPTION OF THE EMBODIMENTS

Hereinafter, embodiments of the present inventive concept will be described with reference to the accompanying drawings.

Referring to FIGS. 1 to 6, a method for detecting a stochastic weak point in a layout pattern of a semiconductor integrated circuit according to an example embodiment of the present inventive concept will be described.

Figure 1:
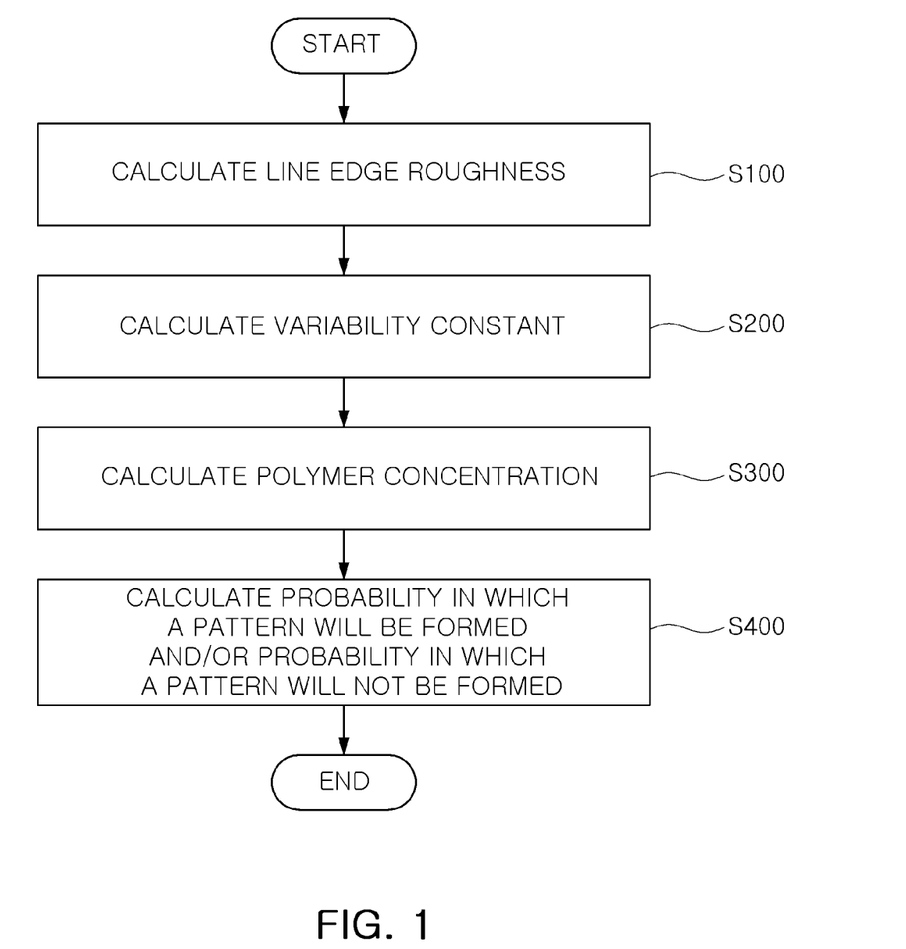
FIG. 1 is a flowchart that illustrates a method for detecting a stochastic weak point of a layout pattern of a semiconductor integrated circuit according to an example embodiment of the present inventive concept.
Figure 2A:
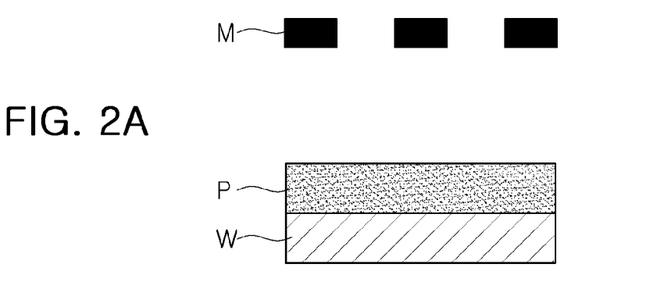
FIGS. 2A to 2C are diagrams that-illustrate a patterning process of a semiconductor integrated circuit.
Figure 2B:
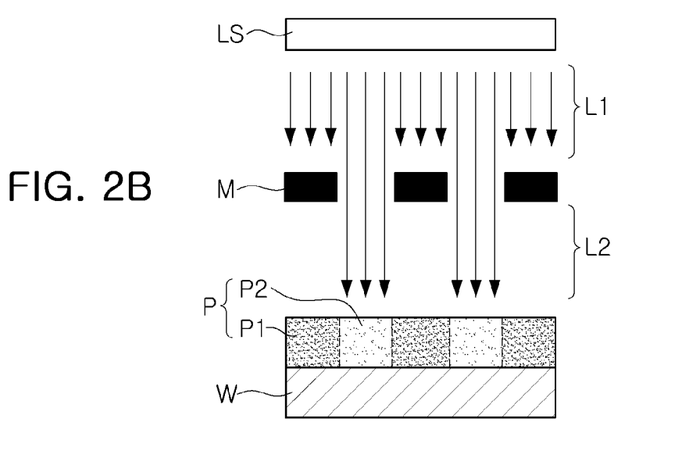
Figure 2C:
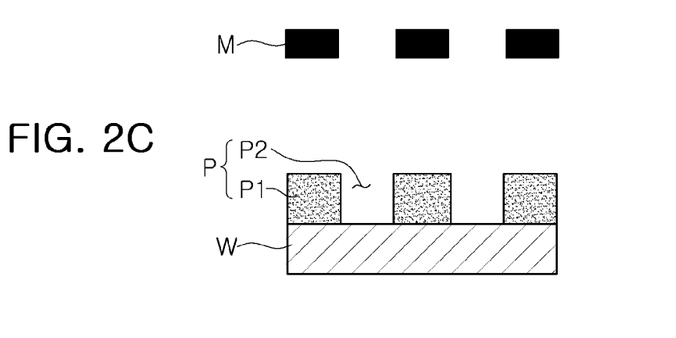
Figure 3:
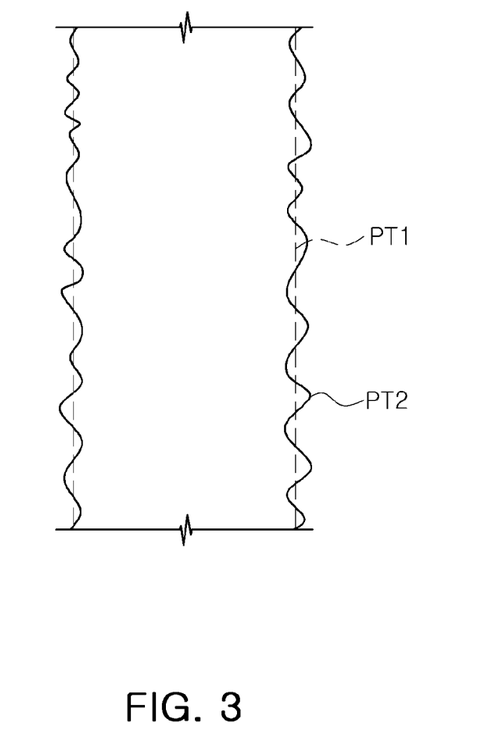
FIG. 3 is a view that illustrates line edge roughness.
Figure 4A:
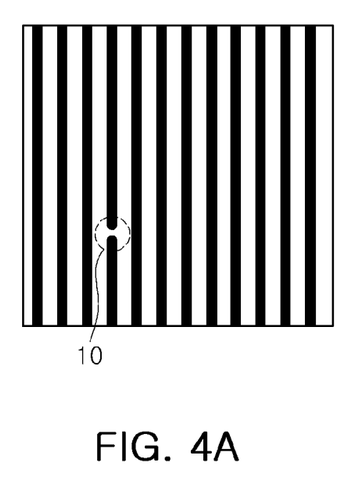
FIGS. 4A and 4B are views that illustrate an example in which a pattern is formed in a region in which a pattern should not be formed.
Figure 4B:
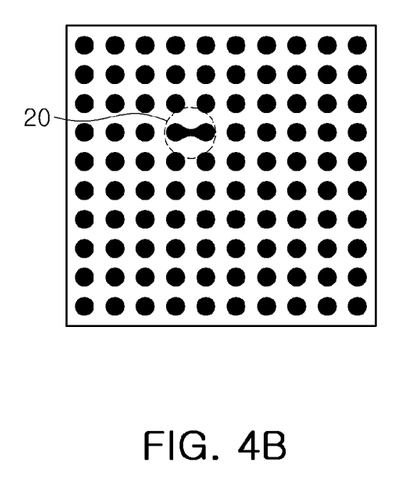
Figure 5A:
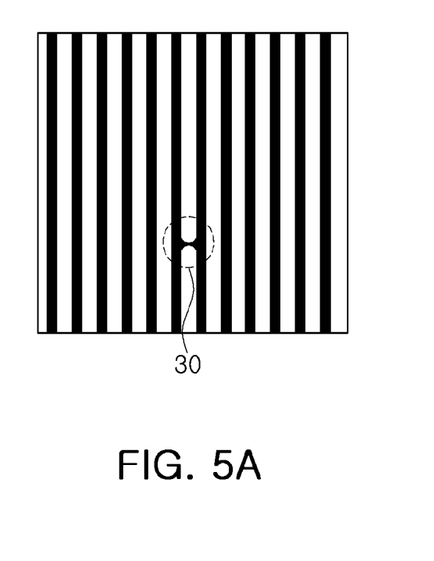
FIGS. 5A and SB are views that illustrate an example in which a pattern is not formed in a region in which a pattern should be formed.
Figure 5B:
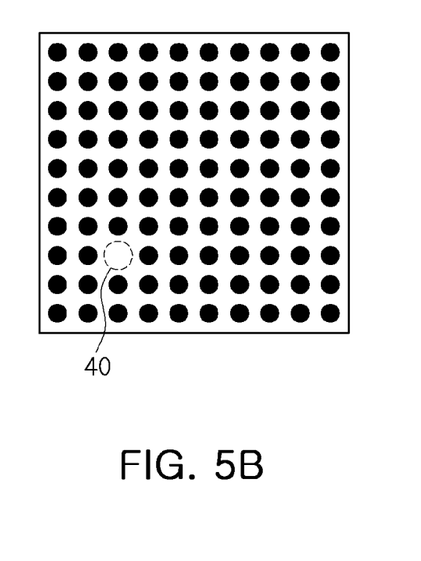
Figure 6:
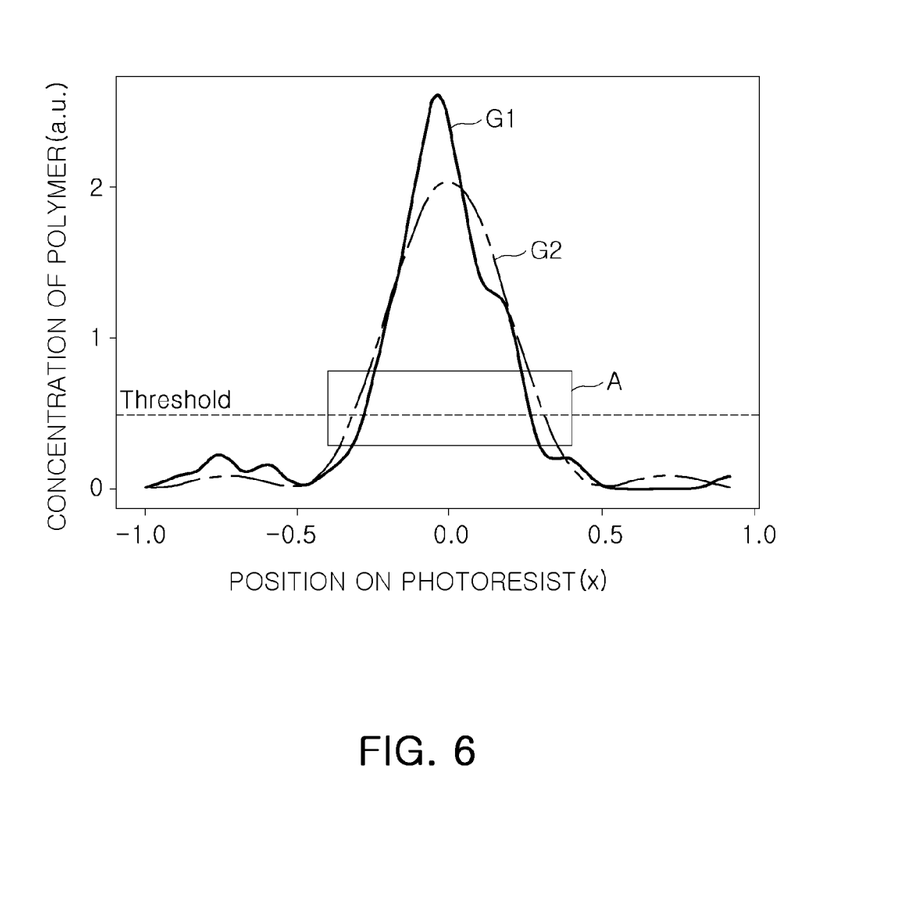
FIGS. 6 to 8 are views that illustrate each step of FIG. 1.
Figure 7:
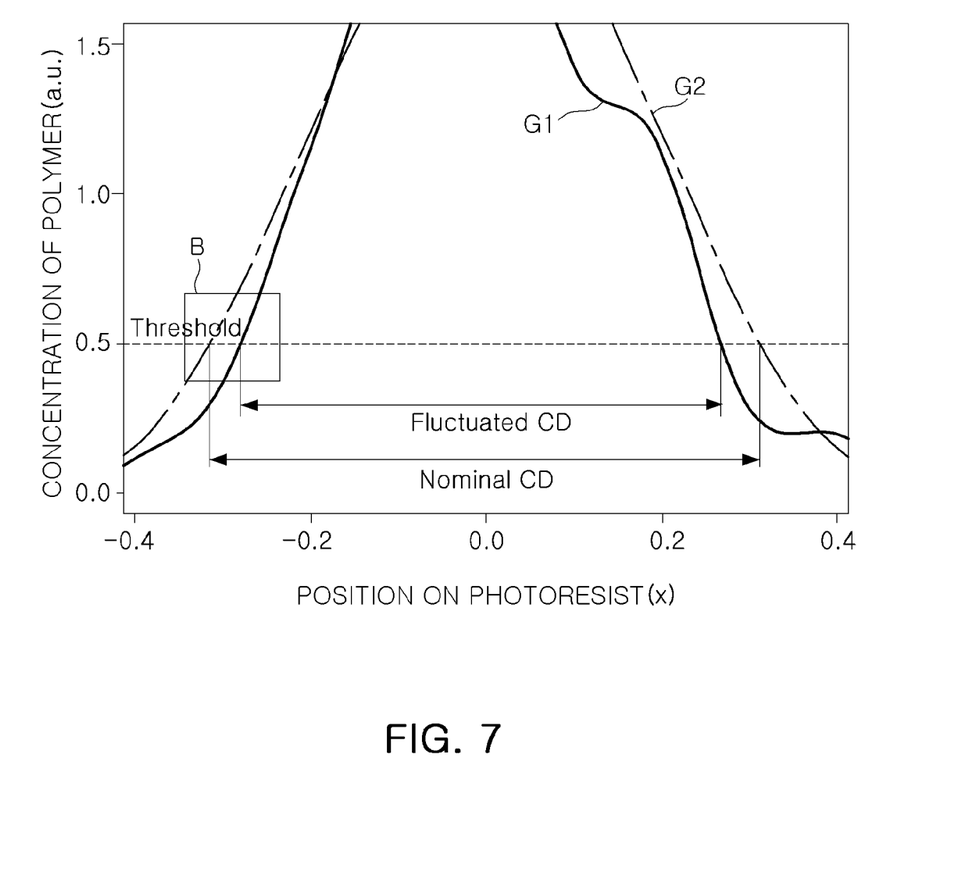
Figure 8:
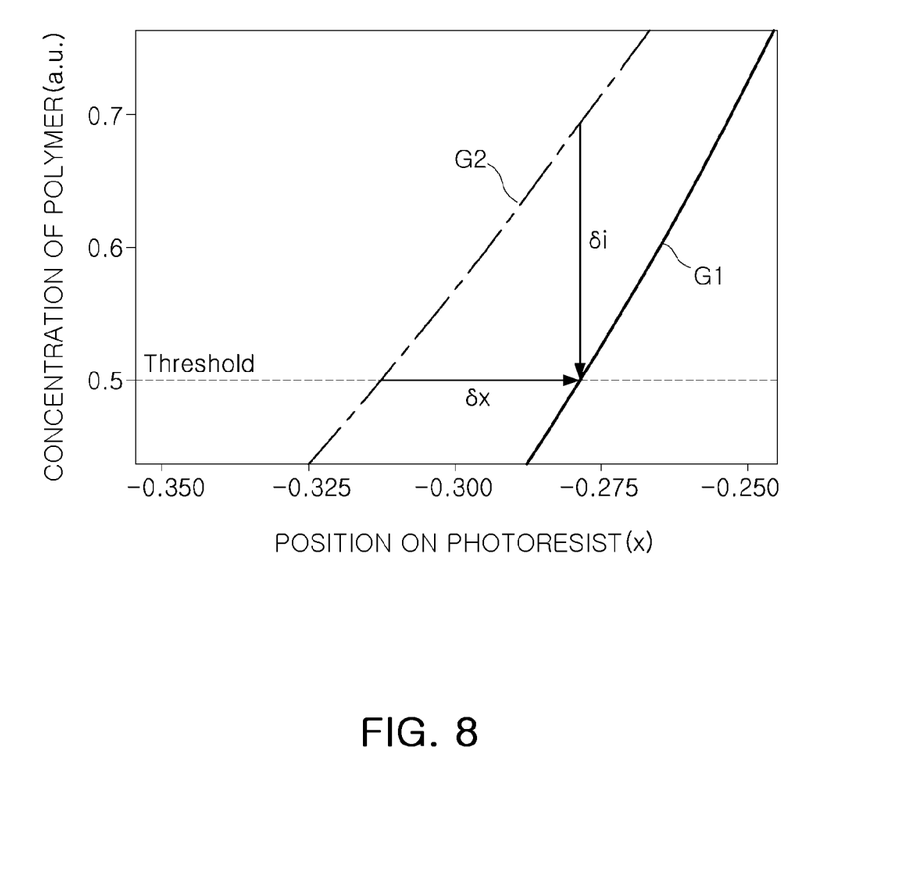

FIG. 1 is a flowchart illustrating a method for detecting a stochastic weak point in a layout pattern of a semiconductor integrated circuit according to an example embodiment of the present inventive concept. FIGS. 2A to 2C are diagrams illustrating a patterning process of a semiconductor integrated circuit, and FIG. 3 is a diagram illustrating line edge roughness. FIGS. 4A and 4B are views illustrating an example in which a pattern is formed in a region in which a pattern should not be formed, and FIGS. 5A and 5B are views illustrating an example in which a pattern is not formed in a region in which a pattern should be formed. FIGS. 6 to 8 are views illustrating each step of FIG. 1.

An overall patterning process of a semiconductor integrated circuit will now be described with reference to FIGS. 2A to 2C.

FIG. 2A illustrates a state of the semiconductor before a photoresist P is exposed, and in FIG. 2A, where the photoresist P is applied on an upper surface of a wafer W, and a mask M corresponding to a layout pattern of a semiconductor integrated circuit is disposed above the wafer W.

Referring to FIG. 2B, when a light source LS is disposed on the mask M and irradiated with light L1, a solubility of a polymer in the photoresist P may be changed. A concentration of the polymer can be determined by intensity of light L2 passing through the mask M.

When the concentration of the polymer in the photoresist P exceeds an exposure threshold, the photoresist P may be removed by a solvent. Conversely, when the concentration of the polymer does not exceed the exposure threshold, the photoresist P may remain on the wafer W. However, the present inventive concept is not necessarily limited thereto, and when the concentration of the polymer does not exceed the exposure threshold, the photoresist P may still be removed from the wafer W. A first region P1 of FIG. 2B is defined as a region in which the photoresist P remains because the light L2 has not been irradiated thereon. A second region P2 is defined as a region onto which the light L2 has been irradiated and from which the photoresist P may be removed.

Referring to FIG. 2C, the first region P1 of the photoresist P remains on the wafer W, and the second region P2 is removed, such that a photoresist pattern corresponding to the layout pattern of the semiconductor integrated circuit is transferred onto the semiconductor. As described above, in the patterning process for forming a pattern of a semiconductor integrated circuit, the shape of the photoresist pattern is determined by the concentration of the polymer of the photoresist P. The concentration of the polymer of the photoresist P is also referred to as resist image intensity ($i_{resist}$).

As a patterning process of the semiconductor integrated circuit enters an ultrafine region, there is need for a pattern having a very narrow line width; for example, a line width of several nanometers (nm). To this end, the patterning process according to an embodiment of the present disclosure employs an extreme ultraviolet (EUV) light source having a wavelength of ⅒ or less than that of conventional ArF exposure equipment. The patterning process that includes the EUV light source is based on reflecting characteristics of optical lithography, which makes the formed pattern more precise as the wavelength decreases. However, as described above, as the wavelength of the light source employed in the exposure equipment is shortened to ⅒ or less, there is an increased chance for stochastic pattern defects to occur.

A stochastic pattern defect can also occur from fluctuations in the intensity or the focus of the light during an exposure process. The stochastic pattern defect occurs due to quantum fluctuations in the intensity of light emitted from the light source. The quantum fluctuations of the irradiated light exist regardless of the light source. The density of states of light is obtained by dividing an amount of light by an energy of an individual photon. When the density of states of light is high, the quantum fluctuations can have a relatively low influence on the patterning process. However, if a wavelength of the light source is decreased significantly, such as in an extreme ultraviolet light source, though the energy of individual photons increases by 10 times or more, there may not be a matching increase in the amount of light, and thus, the density of state of light becomes very low. For example, a high density of the state of light may provide a more consistent change to the polymer in the photoresist, thereby resulting in a more consistent patterning process. In such a case where the light source wavelength is decreased significantly, and the density of the state of light becomes very low, the influence of quantum fluctuations on the patterning process may be further increased. Accordingly, the concentration of the polymer of the photoresist P, that is, the fluctuation of the resist image intensity ($i_{resist}$) was further increased.

According to an example embodiment of the present inventive concept, by calculating the resist image intensity ($i_{resist}$) resulting from quantum fluctuations, stochastic defects that occur in the patterning process may be predicted.

For example, in an example embodiment of the present inventive concept, both a region in which a pattern is formed but should not be formed, and a region in which a pattern is not formed but should be formed, may be predicted by modeling quantum fluctuations of the concentration of the polymer of the photoresist P for calculating the resist image intensity ($i_{resist}$).

FIGS. 4A and 4B are diagrams illustrating an example in which a pattern is formed in a region in which the pattern should not be formed, and illustrate example regions 10 and 20 where patterns are formed but should not be formed. FIG. 4A is a pattern in which a white portion is formed, and FIG. 4B is a pattern in which a black portion is formed.

FIGS. 5A and 5B are diagrams illustrating an example in which a pattern is not formed in a region in which a pattern should be formed, and illustrate example regions 30 and 40 in which the pattern is not formed but should be formed. FIG. 5A is a pattern in which a white portion is formed, and FIG. 5B is a pattern in which a black portion is formed.

A method for detecting a stochastic weak point in the layout pattern of a semiconductor integrated circuit according to an example embodiment of the present disclosure can predict the regions 10 and 20 in which a pattern should be but is not formed, and further predict regions 30 and 40 in which a pattern should be but is not formed.

A method for detecting a stochastic weak point of a layout pattern of a semiconductor integrated circuit according to an example embodiment will be now described in detail with reference to FIGS. 1 and 6 to 8.

FIG. 1 is a flowchart illustrating a method for detecting stochastic weak point of a layout pattern of a semiconductor integrated circuit according to an example embodiment of the present inventive concept, and FIGS. 6 to 8 are diagrams illustrating each step of FIG. 1.

Referring to FIG. 1, a method for detecting a stochastic weak point of a layout pattern of a semiconductor integrated circuit according to an example embodiment of the present inventive concept includes a step of calculating line edge roughness (S100), calculating a variability constant (S200), calculating a concentration of a polymer (S300), and calculating a probability that a pattern will be formed and/or a probability that a pattern will not be formed (S400).

Referring to FIG. 1, a step S100 of calculating line edge roughness (LER) is performed.

Referring to FIG. 3, the line edge roughness LER illustrates a relationship between a first pattern PT1 expected to be formed by a mask and a second pattern PT2 actually formed by the photoresist. The line edge roughness LER is defined as a value obtained by squaring and averaging a distance between the first pattern PT1 and the second pattern PT2.

For example, the line edge roughness LER may be calculated based on measured values from the actually formed second pattern PT2.

Referring to FIG. 1, an operation of calculating a variability constant is performed (S200). The variability constant is used for fitting the previously calculated line edge roughness LER into a normal distribution.

The intensity ($i_{resist}$) of the resist image, which is the concentration of the polymer of the photoresist P, may be determined stochastically. A diffusion coefficient of the polymer in the photoresist is determined by how the photoresist P interacts with the light L, and may be known. Assuming that the total value of the intensity of light reaching the photoresist is sufficiently large, and the diffusion coefficient of the polymer is sufficiently low, the concentration of a soluble polymer ($i_{resist}(x)$) at a given point x on the photoresist follows a normal distribution as shown in Equation 1 below.

$$i_{resist}(x) \sim N(i_{nominal}, \kappa^2 D_{open} i_{aerial}(x))$$ [Equation 1]

where, $i_{nominal}$ is a concentration of a polymer that does consider a quantum mechanical effect, and is an average value of a normal distribution. $\kappa^2 D_{open} i_{aerial}(x)$ is a square value of a standard deviation, $D_{open}$ is a total value of intensity of light reaching a photoresist P, and $i_{aerial}$ is the intensity of light reaching a point x of the photoresist P.

Referring to FIG. 6, when quantum mechanical effects are not considered, a concentration distribution of the polymer in one region of the photoresist follows a second graph G2. As illustrated, the graph G2 is indicated by a dashed line. A first graph G1, indicated by a solid line, is a graph of the concentration distribution of the polymer in consideration of the quantum mechanical effect. The variability constant mentioned above may be calculated to fit the second graph G2 to the first graph G1.

Referring to FIG. 7, in the first graph G1 and the second graph G2, a concentration value of a polymer at an exposure threshold is different, and accordingly a difference in critical dimension CD of the formed pattern occurs. A fluctuated critical dimension (CD) considering the quantum mechanical effect has a smaller range than a nominal critical dimension (CD) not considering the quantum mechanical effect.

Referring to FIG. 8, δi, which is a difference in concentration of the polymer in the first graph G1 and the second graph G2, may be determined by Equation 2 below.

$$\delta i \sim N\left(0, \kappa \sqrt{\frac{i_{aerial}}{D_{open}}}\right)$$ [Equation 2]

A difference in position δx between the first graph G1 and the second graph G2 has a relationship between the line edge roughness LER previously calculated and Equation 3 below.

$$\kappa^2 \frac{i_{aerial}}{D_{open}} = \left(\frac{\partial i_{resist}}{\partial x}\right)^2 \times LER$$ [Equation 3]

A constant k is a so-called variability constant determining variability, and may be determined as in Equation 4 below.

$$\kappa^2 = \frac{\frac{\partial i_{nominal}}{\partial x}(x_0)}{D_{open}^2 i_{aerial}(x_0)} \times LER$$ [Equation 4]

where, $x_0$ denotes a boundary of the pattern formed by patterning in which the quantum mechanical effect is ignored (e.g., PT1 in FIG. 3).

Referring to FIGS. 1 and 8, a probability distribution of a polymer concentration ($i_{resist}(x)$) is be calculated by substituting the previously calculated variability constant k into a normal distribution (S300).

Referring to FIG. 8, a probability ($P_{pixel}(x)$) in which a pixel, for example, a mask pixel for forming a pattern, will be formed at a point on a photoresist P, is be defined as a probability in which a concentration ($i_{resist}(x)$) of the polymer is greater than an exposure threshold (T) of the photoresist, as shown in Equation 5 below.

$$p_{pixel}(x) = N(i_{nominal}, \kappa^2 D_{open} i_{aerial}(x)) \; (i_{resist}(x) \geq \tau)$$ [Equation 5]

Referring to FIG. 1, a probability of forming a pattern and/or a probability of not forming a pattern is be calculated (S400).

When the probability ($P_{pixel}(x)$) that the pixel will be formed for the mask at a point on the photoresist P is expressed as a Poisson distribution calculated as described above, a probability ($P_{pattern}$) in which a pattern is to be formed in a region in which the pattern should not be formed, and a probability ($P_{no\;pattern}$) in which a pattern should be but is not formed for a given region A is defined as in Equation 6 below.

$$p_{pattern}(A) = e^{-area(A) + \int_A dx \; p_{pixel}(x)}$$ [Equation 6]

$$p_{no\;pattern}(A) = e^{-\int_A dx \; p_{pixel}(x)}$$

As described above, according to an example embodiment of the present inventive concept, a stochastic defect that may occur in a patterning process can be predicted through a model which predicts the variability of the photoresist image intensity based on a theory of quantum mechanical reconstruction of the exposure process.

Accordingly, an example embodiment of the present inventive concept may be used to predict a defect rate before the fabrication of a semiconductor device by checking a point that is vulnerable to stochastic defects among a layout pattern.

In addition, an example embodiment of the present inventive concept may reflect a stochastic factor when defining a process limit or the like through prediction of stochastic weak point. Therefore, by designing around the stochastic weak point and setting the process limit, it is possible to prevent the occurrence of patterning defects in the actual process.

Figure 9:
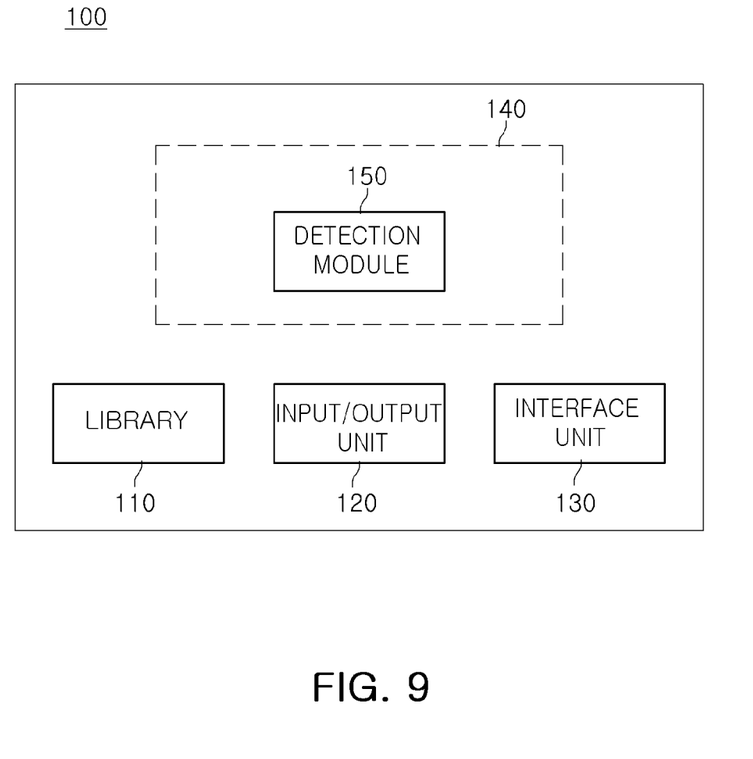
FIG. 9 is a block diagram schematically that illustrates a computer system configured to perform a method for detecting stochastic weak point of a layout pattern of a semiconductor integrated circuit according to an example embodiment of the present inventive concept.

Referring to FIG. 9, a computer system for performing a method for detecting a stochastic weak point of a layout pattern of a semiconductor integrated circuit according to an example embodiment of the present inventive concept will be described. FIG. 9 is a block diagram schematically illustrating a computer system configured to perform a method for detecting a stochastic weak point of a layout pattern of a semiconductor integrated circuit according to an example embodiment of the present inventive concept.

Referring to FIG. 9, a computer system 100 may include a library 110 for storing a layout pattern for forming a semiconductor integrated circuit. In addition, in the library 110, line edge roughness measured in a semiconductor integrated circuit formed by exposing the layout pattern for forming the semiconductor integrated circuit may be stored. The library 110 may include a memory, such as a hard disk and/or a non-volatile semiconductor memory device, e.g., a flash memory device, a phase change memory device, and/or a magnetic memory device. The computer system 100 may include a control unit 140 for processing various data. For example, the control unit 140 may be implemented as a processor such as a central processing device (CPU), a graphic processing device (GPU), a microprocessor, an application specific integrated circuit (ASIC) or field programmable gate arrays (FPGA), and may include a memory for storing various data. The controller 140 may include a detection module 150 for detecting a weak point of a layout pattern provided from the library 110. Specifically, the detection module 150 may calculate a variability constant for fitting the line edge roughness to a normal distribution from a result value calculated by simulating the layout pattern provided from the library 110. The detection module 150 may calculate a probability distribution of a polymer concentration value at any point of the layout pattern based on the variability constant. The detection module 150 may calculate a stochastic weak point of the layout pattern from the probability distribution.

The computer system 100 may include an input/output unit 120 and an interface unit 130. The input/output unit 120 may include a keyboard, a keypad, and/or a display device. Various data provided from the outside, for example, data provided from a user, may be transferred to the computer system 100 through the interface unit 130, and various data processed by the computer system 100 may also be transferred to the outside through the interface unit 130. The interface unit 130 may include a wired element, a wireless element, and/or a universal serial bus (USB) port. The library 110, the input/output unit 120, the interface unit 130, and the control unit 140 may be coupled to each other through a data bus.

The computer system according to an example embodiment of the present inventive concept may predict stochastic defects that may occur in the patterning process through a model which predicts the variability of the resist image intensity based on the theory of quantum mechanical reconstruction of the exposure process.

Accordingly, the computer system according to an example embodiment of the present inventive concept may predict and provide a defect rate before a semiconductor fabrication by confirming a pattern that is vulnerable to stochastic defects among patterns in a given layout pattern in advance. In addition, stochastic factors may be considered when defining process limits through prediction of stochastic weak point. Therefore, by designing around the stochastic vulnerability and setting the process limit, it is possible to prevent patterning defects from occurring in an actual process As set forth above, according to the technical idea of the present inventive concept, since a method for detecting a stochastic weak point of a layout pattern of a semiconductor integrated circuit models quantum fluctuations of intensity of light irradiated onto a photoresist, the method may be used to predict a defect rate in advance by checking the stochastic weak point among patterns in a layout pattern in advance.

Since a computer system configured to perform the method for detecting the stochastic weak point of a layout pattern of a semiconductor integrated circuit layout pattern of a semiconductor integrated circuit according to the technical idea of the present inventive concept models and considers quantum fluctuations of intensity of light irradiated to a photoresist, the computer system may be used to predict a defect rate before a semiconductor fabrication by checking a stochastic weak point among patterns on a given layout pattern in advance.

While the example embodiments have been shown and described above, it will be apparent to those skilled in the art that modifications and variations may be made without departing from the scope of the present inventive concept as defined by the following claims.

What is claimed is:

1. A method for detecting a stochastic weak point of a layout pattern for a semiconductor integrated circuit, the method comprising:
    forming a semiconductor integrated circuit by exposing a wafer, masked by a layout pattern and coated with a photoresist, to light from a light source, and etching the semiconductor integrated circuit according to the layout pattern,
    calculating line edge roughness (LER) of the semiconductor integrated circuit;
    calculating a variability constant that fits the line edge roughness to a normal distribution, wherein the variability constant is calculated from a polymer concentration value of the photoresist, wherein the polymer concentration value is calculated from modeling the layout pattern, a total value of intensity of light reaching the photoresist, and an intensity value of light reaching one point of the photoresist;
    calculating a probability distribution of the polymer concentration value of the layout pattern based on the variability constant; and
    calculating a stochastic weak point of the layout pattern from the probability distribution.

2. The method of claim 1, wherein calculating the stochastic weak point of the layout pattern from the probability distribution comprises:
    calculating a first probability that the semiconductor integrated circuit will be formed in a predetermined region of the layout pattern, and/or
    calculating a second probability that the semiconductor integrated circuit will not be formed in the predetermined region of the layout pattern from the probability distribution.

3. The method of claim 2, wherein the first probability satisfies Equation 1 below, $$p_{pattern}(A) = e^{-area(A) + \int_A dx\, p_{pixel}(x)} \quad \text{[Equation 1]}$$

where, in the Equation 1, e is Euler's number, x is a position in the photoresist, $\int_A dx$ represents an integration over A with respect to each position x, $P_{pattern}(A)$ is the first probability, A is the predetermined region, and $P_{pixel}(x)$ is a probability that the semiconductor integrated circuit to be formed at the one point of the photoresist.

4. The method of claim 2, wherein the second probability satisfies Equation 2 below, $$p_{no\ pattern}(A) = e^{-\int_A dx\, p_{pixel}(x)} \quad \text{[Equation 2]}$$

where, in the Equation 2, A is the predetermined region, $P_{no\ pattern}(A)$ is the second probability, e is Euler's number, x is a position in the photoresist, $\int_A dx$ resents an integration over A with respect to each position x, and $P_{pixel}(x)$ is a probability that the semiconductor integrated circuit is not to be formed at one point of the photoresist.

5. The method of claim 1, wherein the variability constant satisfies Equation 3 below, $$\kappa^2 = \frac{\frac{\partial i_{nominal}}{\partial x}(x_0)}{D_{open}^2 i_{aerial}(x_0)} \times LER \quad \text{[Equation 3]}$$

where in the Equation 3, κ is the variability constant, $i_{nominal}$ is the polymer concentration value of the photoresist, $D_{open}$ is the total value of the intensity of light reaching the photoresist, $i_{serial}$ is the intensity value of light reaching one point of the photoresist, $x_0$ denotes a boundary of the pattern in which a quantum mechanical effect is ignored, δ indicates a partial derivative of the variable it is concatenated with, and LER is the line edge roughness.

6. The method of claim 1, wherein the probability distribution of the polymer concentration value at one point of the layout pattern satisfies Equation 4 below, $$p_{pixel}(x) = N(i_{nominal}, \kappa^2 D_{open} i_{aerial}(x))\ (i_{resist}(x) \geq \tau) \quad \text{[Equation 4]}$$

where, in the Equation 4, $p_{pixel}(x)$ is the probability that a pixel will be formed for the mask at a point x in the photoresist P, κ is the variability constant, N indicates a normal distribution, $i_{nominal}$ is the polymer concentration value of the photoresist calculated by modeling the layout pattern, $D_{open}$ is the total value of intensity of light reaching the photoresist, $i_{aerial}$ is the intensity value of light reaching one point of the photoresist, $i_{resist}$ is the polymer concentration value, and τ is an exposure threshold value of the photoresist.

7. The method of claim 1, wherein, after the wafer is exposed to the light from the light source, the photoresist is removed from the wafer.

8. The method of claim 1, wherein, when the photoresist on the wafer is exposed to the light from the light source, a polymer concentration value of the photoresist increases.

9. The method of claim 1, wherein the light source irradiates extreme ultraviolet rays.

10. The method of claim 1, wherein the polymer concentration value satisfies the following Equation 5, $$i_{resist}(x) \sim N(i_{nominal}, \kappa^2 D_{open} i_{aerial}(x)) \quad \text{[Equation 5]}$$

where, in the Equation 5, $i_{resist}(x)$ is to the concentration of a soluble polymer at a point x on the photoresist, ~ is a symbol that notates "is distributed as", N refers to a normal distribution, κ is the variability constant, $i_{nominal}$ is the polymer concentration value of the photoresist calculated by modeling the layout pattern, $D_{open}$ is the total value of intensity of light reaching the photoresist, and $i_{aerial}$ is the intensity value of light reaching one point of the photoresist.

11. A method for detecting a stochastic weak point of a layout pattern of a semiconductor integrated circuit, the method comprising:
   forming a semiconductor integrated circuit by exposing a wafer, masked by a layout pattern and coated with a photoresist, to light from a light source, and etching the semiconductor integrated circuit according to the layout pattern,
   calculating line edge roughness (LER) from the semiconductor integrated circuit;
   calculating a variability constant for fitting the line edge roughness to a normal distribution from a result value calculated by simulating the layout pattern;
   calculating a probability distribution of a polymer concentration value of the layout pattern based on the variability constant; and
   calculating a stochastic weak point of the layout pattern from the probability distribution.

12. The method of claim 11, wherein, when the photoresist on the wafer is exposed to the light from the light source, a polymer concentration value of the photoresist increases.

13. The method of claim 12, wherein the polymer concentration value satisfies Equation 6 below, $$i_{resist}(x) \sim N(i_{nominal}, \kappa^2 D_{open} i_{aerial}(x)) \quad \text{[Equation 6]}$$

where, in the Equation 6, $i_{resist}(x)$ is to the concentration of a soluble polymer at a point x on the photoresist, ~ is a symbol that notates "is distributed as", N refers to a normal distribution, κ is the variability constant, $i_{nominal}$ is the polymer concentration value of the photoresist calculated by simulating the layout pattern, $D_{open}$ is a total value of intensity of light reaching the photoresist, and $i_{aerial}$ is an intensity value of light reaching the photoresist.

14. The method of claim 11, wherein calculating the variability constant comprises:
   calculating a variability constant for fitting the line edge roughness to a normal distribution from a polymer concentration value of the photoresist, wherein the polymer concentration value of the photoresist is calculated from modeling the layout pattern, a total value of intensity of light reaching the photoresist, and an intensity value of light reaching one point of the photoresist.

15. The method of claim 11, wherein calculating the stochastic weak point of the layout pattern from the probability distribution comprises:
    calculating a first probability in which the semiconductor integrated circuit will be formed in a predetermined region of the layout pattern, and/or
    calculating a second probability that the semiconductor integrated circuit is not to be formed in the predetermined region of the layout pattern, from the probability distribution.

\* \* \* \* \*